(12) United States Patent
Feroli et al.

(10) Patent No.: US 7,388,749 B1
(45) Date of Patent: Jun. 17, 2008

(54) SUPPORT CARRIER FOR A DISK-DRIVE WITH INTEGRATED HEAT-SINK

(75) Inventors: Lawrence J. Feroli, West Townsend, MA (US); Albert F. Beinor, Jr., Sutton, MA (US); Joseph P. King, Jr., Sterling, MA (US); C. Ilhan Gundogan, Lexington, MA (US); Stephen J. Keefe, Boylston, MA (US)

(73) Assignee: EMC Corporation, Hopkinton, MA (US)

( * ) Notice: Subject to any disclaimer, the term of this patent is extended or adjusted under 35 U.S.C. 154(b) by 140 days.

(21) Appl. No.: 11/324,354

(22) Filed: Jan. 3, 2006

(51) Int. Cl.
*H05K 7/20* (2006.01)

(52) U.S. Cl. ............ 361/704; 361/687; 361/707; 361/715; 361/727

(58) Field of Classification Search ............ None
See application file for complete search history.

(56) References Cited

U.S. PATENT DOCUMENTS

| | | | | |
|---|---|---|---|---|
| 5,694,290 A | * | 12/1997 | Chang | 361/685 |
| 5,927,386 A | * | 7/1999 | Lin | 165/80.3 |
| 6,373,696 B1 | * | 4/2002 | Bolognia et al. | 361/687 |
| 6,434,000 B1 | * | 8/2002 | Pandolfi | 361/685 |
| 6,490,123 B1 | * | 12/2002 | Okunaga et al. | 360/97.01 |
| 6,735,080 B1 | * | 5/2004 | Chang | 361/695 |
| 6,819,555 B2 | * | 11/2004 | Bolognia et al. | 361/685 |
| 6,867,963 B2 | * | 3/2005 | Staiano | 361/685 |
| 6,882,525 B2 | * | 4/2005 | Paul et al. | 361/685 |
| 6,980,437 B2 | * | 12/2005 | Bright | 361/704 |
| 7,009,835 B2 | * | 3/2006 | Desai et al. | 361/683 |
| 7,012,805 B2 | * | 3/2006 | Shah et al. | 361/685 |
| 7,035,097 B2 | * | 4/2006 | Petrov et al. | 361/685 |
| 7,054,153 B2 | * | 5/2006 | Lewis et al. | 361/685 |
| 7,068,506 B2 | * | 6/2006 | Behl | 361/695 |
| 7,167,368 B2 | * | 1/2007 | Ya | 361/707 |
| 7,215,506 B2 | * | 5/2007 | Albrecht et al. | 360/97.01 |
| 2006/0198099 A1 | * | 9/2006 | Chapel | 361/687 |
| 2007/0019379 A1 | * | 1/2007 | Hsiao | 361/685 |
| 2007/0030646 A1 | * | 2/2007 | Hsu | 361/687 |

* cited by examiner

*Primary Examiner*—Boris L Chervinsky
(74) *Attorney, Agent, or Firm*—Krishnendu Gupta; Robert Kevin Perkins

(57) ABSTRACT

This invention is a support carrier for attaching a smaller format disk drive into a chassis bay sized for receiving a larger disk drive, the support carrier includes a heat-sink surface with pin fins for conducting and removing heat from the smaller disk drive.

19 Claims, 7 Drawing Sheets

SUPPORT CARRIER FOR A DISK-DRIVE WITH INTEGRATED HEAT-SINK

FIELD OF THE INVENTION

This application generally relates to supports for a data disk drive, and more particularly to a support for a data disk drive having a heat-sink integral to the support.

RELATED APPLICATION

This U.S. Patent application is related to an application with S/N (to be determined) entitled "A Retaining Device for a Disk Drive on a Support Carrier" being filed on even date to inventor Feroli et al. and assigned to EMC Corporation of Hopkinton, the same assignee as this application.

BACKGROUND

Computer systems may include different resources used by one or more host processors. Resources and host processors in a computer system may be interconnected by one or more communication connections. These resources may include, for example, data storage systems, such as the Symmetrix™ or CLARiiON™ (also referred to herein as Clariion) family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

The data storage systems are also known as data storage arrays because they typically contain a plurality of disk drives, each of which generates a significant amount of heat which must be removed from the disk drive and the surrounding circuitry in an expedient fashion. Failure to do so has been shown to lead to reduced reliability or component failure. Fans are typically employed to create forced air to remove such heat from the system. As the disk drives get smaller and their storage capacity increases, the crowding of components and the mechanical and electrical activity associated with storing and retrieving data in such tightly compacted environments has lead to challenges in maintaining adequate drive temperatures.

It may be necessary to continue using larger disk drives while smaller drives are being phased in and in so doing the various geometries due to the different sizes may create a non-uniform impedance to air flow that could adversely affect the temperatures of some of the drives. It would be an advancement in the art to provide a way for removing heat from a data storage system including a plurality of disk drives, including disk drives of various sizes, such as smaller ones being used along side of larger ones, for example 2.5 inch format disk drives along side of 3.5 disk format disk drives.

SUMMARY

To overcome the problems of the prior art mentioned above and to provide advantages also described above, this invention is a support carrier for attaching a smaller format disk drive into a chassis bay sized for receiving a larger disk drive. The support carrier includes a frame surrounding the area in which a smaller format disk drive can be attached and supported, wherein the frame is sized for being received into the bay of a chassis sized for a larger format disk drive. The carrier includes a planer surface, on which the smaller format disk drive can be attached for supporting the smaller disk drive. A heat-sink surface is disposed adjacently opposite of and attached to the planer surface for conducting heat from the smaller format disk drive. Pin fins protrude from the planar surface to increase the surface area available for heat removal.

BRIEF DESCRIPTION OF THE DRAWING

The above and further advantages of the present invention may be better under stood by referring to the following description taken into conjunction with the accompanying drawings in which identical numbers for elements appearing in different drawing figures represent identical or similar elements throughout the figures.

DETAILED DESCRIPTION OF THE PREFERRED EMBODIMENTS

Figure 1:
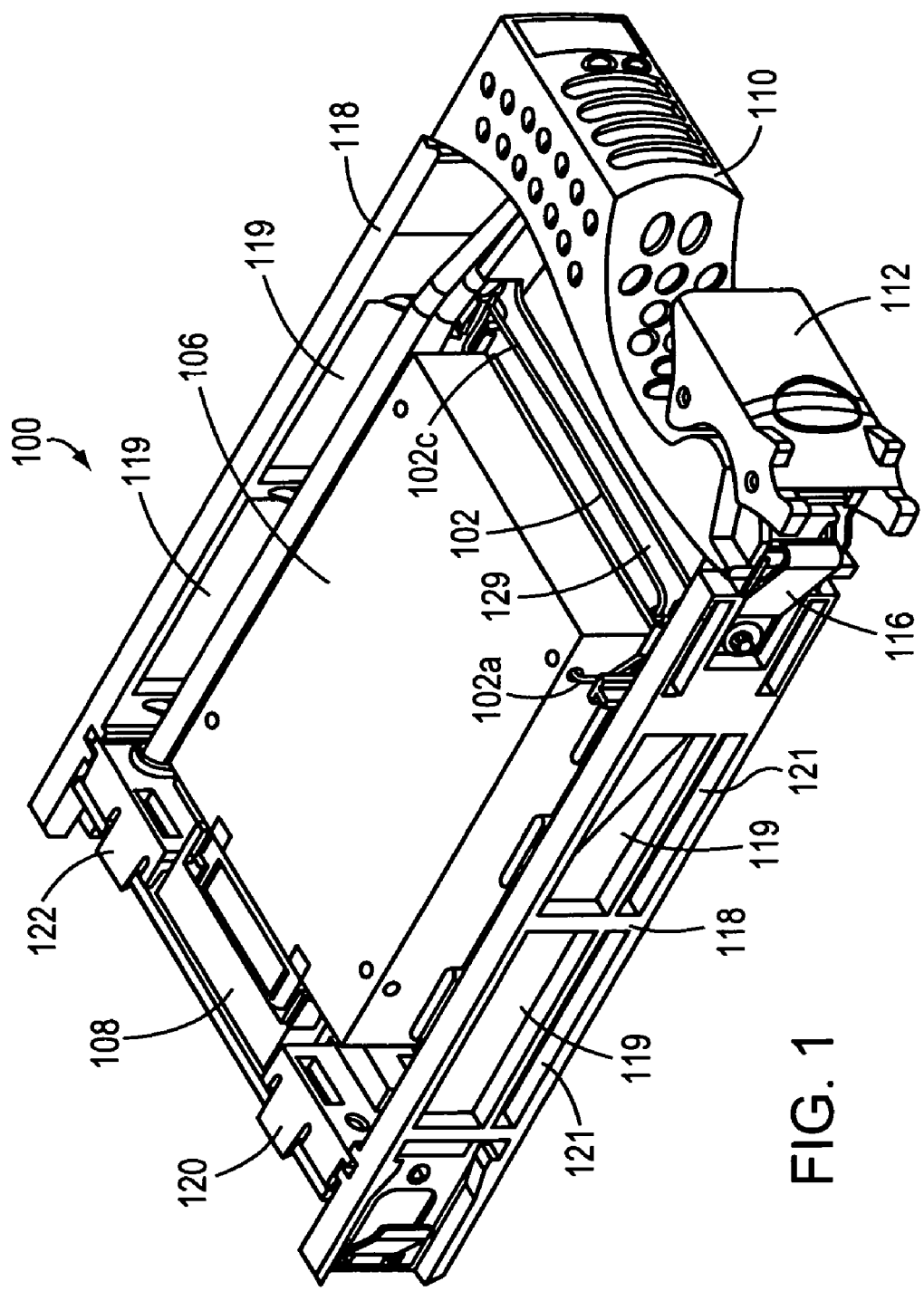
FIG. 1 shows a perspective view of a support carrier for a small disk drive that allows the disk drive to be accepted in a drive bay designed for accepting a larger disk drive and including integrated heat-sink pin fins and a removable retention device, the perspective being from a top-oriented viewing angle relative to the carrier.

Referring to FIG. 1, a support carrier 100 embodying the present invention is shown, so called because it supports a disk drive and may be used to carry it after the disk drive is attached to a chassis (FIGS. 5 and 6) on a data storage system (not shown) for installation. The support carrier is shown with a disk drive 106 fixedly attached by retaining device or retainer 102 onto planar surface 129 which is part of the carrier. The carrier includes side walls 118 with openings 119 and 121 on both members for allowing air to flow underneath the surface on which the disk drive rests when fixedly attached as shown. Air movement is induced by a fan (not shown), as is known in the art, and flows over integrated heat-sink pin fins for heat removal, which are discussed in more detail with regard to FIGS. 2-4 below.

Back alignment tabs 120 and 122 help align and attach the support carrier when placed in a chassis that may accept a plurality of disk drives, including many which are larger than the disk drive 106. The support carrier has a larger outside size to allow it to fit into and be accepted in a chassis bay for a larger disk drive. For example, a well-known disk drive size has a 3.5 inch (3.5") form factor, but is being replaced over time with smaller disk drives having a 2.5" form factor. Support carrier 100 can serve as a 3.5" to 2.5" drive adaptor carrier to allow a customer to extend the life of their system infrastructure when 3.5" drive availability declines to the point where 2.5" drives are the dominant drive form factor. This allows customers/users to use 2.5" drives in their chassis' designed for 3.5" drives. Front latches 112 and 110 are used for allowing a installer to easily place the carrier 100 in a chassis, and port slot 108 allows the disk drive to extend its communication port through the carrier to attach to a data storage system's electronics. Side tab 116 further aligns and attaches the carrier to the chassis. Side walls 118, the Front Latches, and the Back Alignment tabs form a frame that surrounds the surface 129 on which the disk drive is attached and retained by retainer 102.

Figure 2:
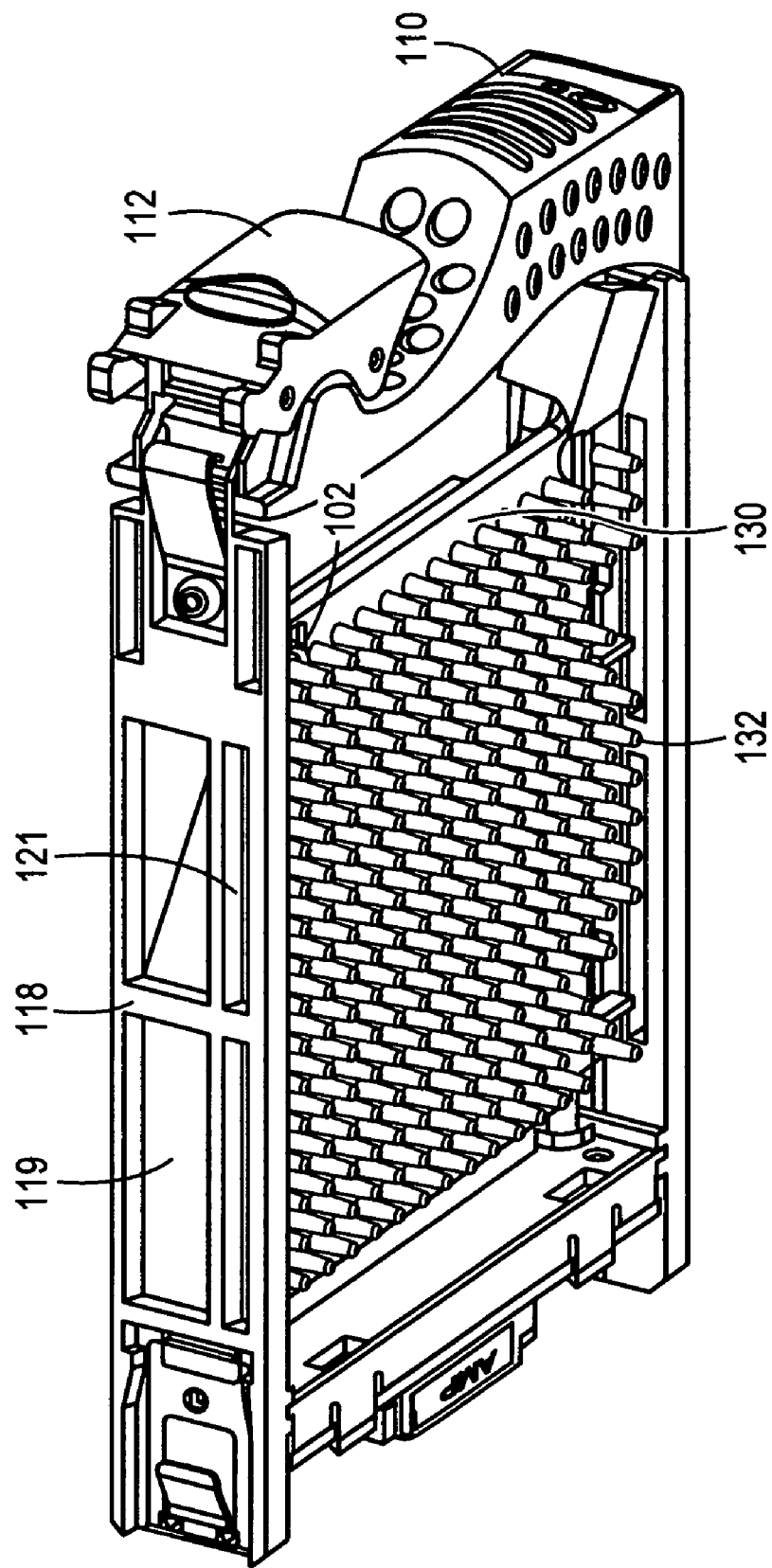
FIG. 2 shows another perspective view of the support carrier from a bottom-oriented viewing angle relative to the support carrier and showing the integrated heat-sink pin fins and the bottom of the retention device.

Reference is now made to FIG. 2, which shows a perspective view of the support carrier 100 from a bottom-oriented viewing angle relative to the support carrier and shows integrated heat-sink pin fins 132 and the bottom of the retention device 102 that is used to hold disk drive 106 in place in the carrier. Surface 129 (FIG. 1) includes a thermal interface material to provide a heat transfer path from the disk drive to the pin fins. A good choice for the thermal material is Chomerics Therma-A-Gap T630.

Figure 3:
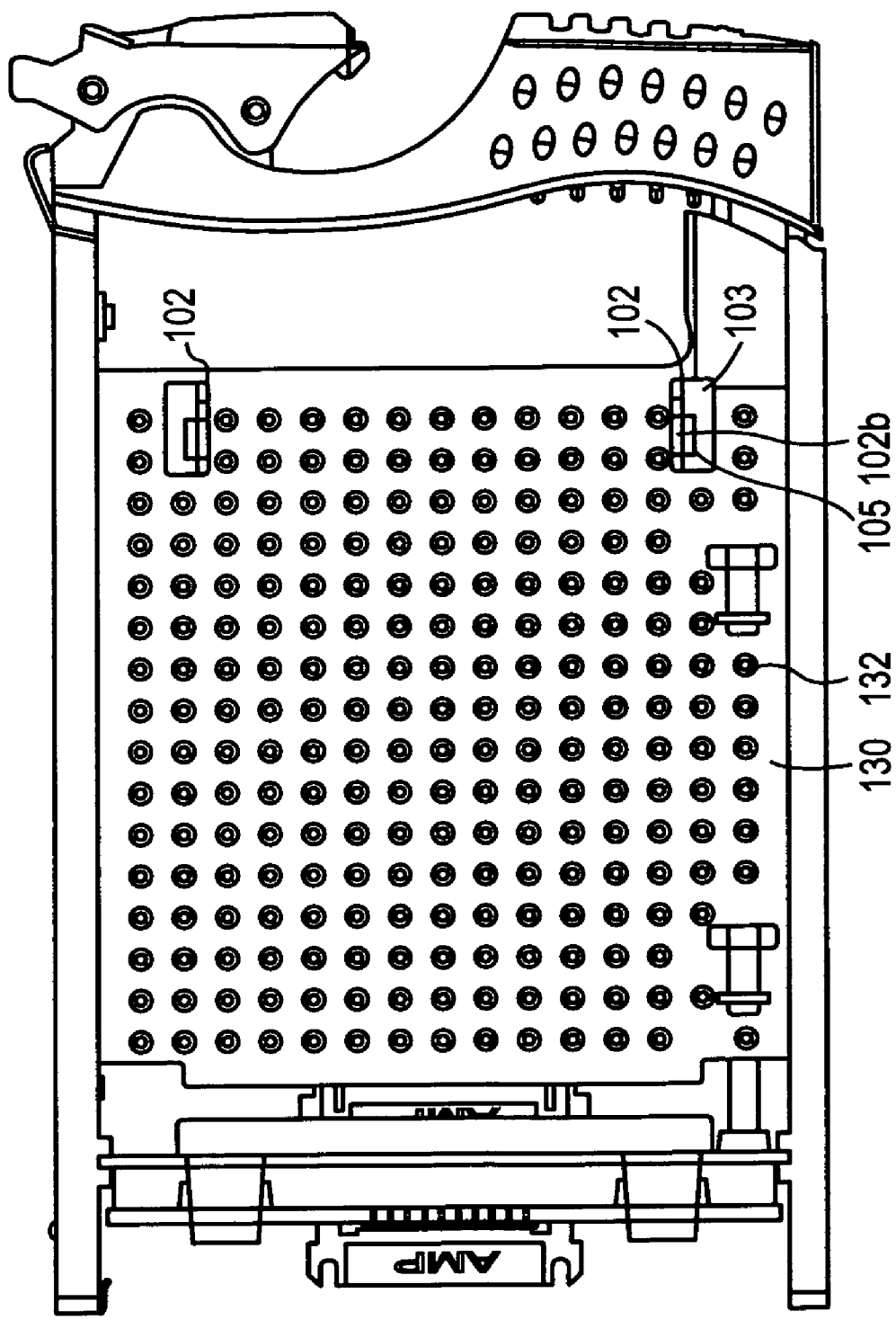
FIG. 3 shows a bottom planer view of the support carrier showing the heat-sink pin fins protruding from a planer surface that is part of the support carrier and also an opening through which the retention device extends to overlap a tab to hold the disk drive in an fixed attachment to the support carrier.
Figure 4:
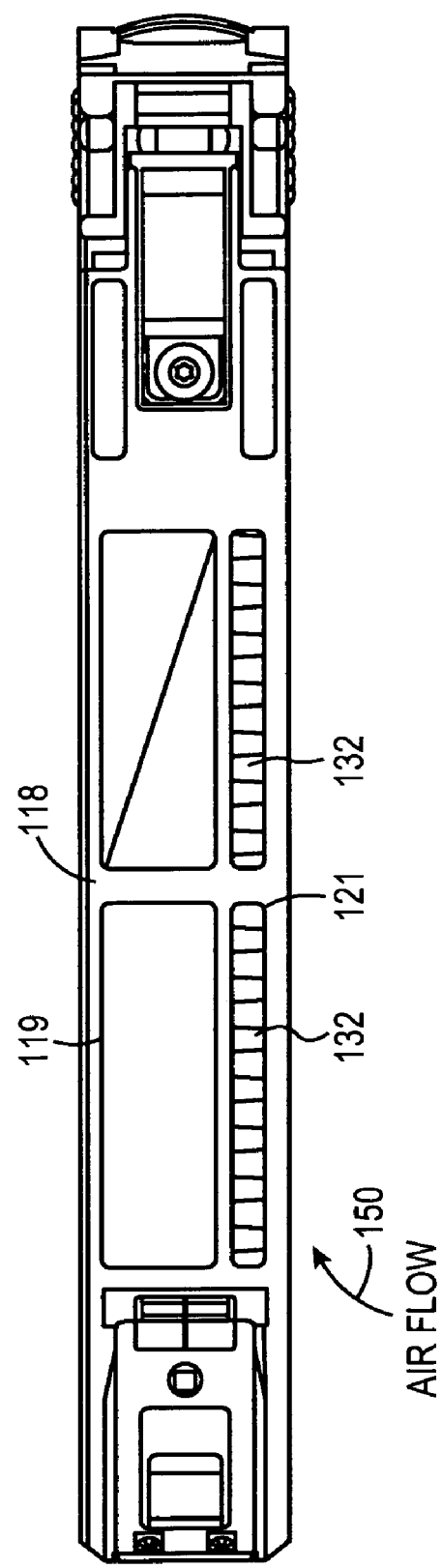
FIG. 4 shows a side planer view of the support carrier showing an opening in the support carrier over which air flows over the pin fins.

Reference is made now to FIGS. 3 and 4. FIG. 3 shows a bottom planer view of the support carrier showing the heat-sink pin fins 132 protruding from a heat-sink planer surface 130 that is part of the support carrier. The thermal material may be sandwiched (not shown) between the surface 129 and the heat-sink planer surface 130, although one skilled in the art may recognize other choices for including the thermal material.

The pin fins are shown in a preferred geometry of being disposed on the surface in a matrix-array fashion, i.e. row-column format. Also shown in FIG. 3 is an opening 103 through which the retention device 102 extends to overlap and secure onto a tab 105 to hold the disk drive 106 in a fixed attachment to the support carrier 100. FIG. 4 shows a side planer view of the support carrier showing an opening 121 in the support carrier over which air flows over the pin fins 132.

Retainer 102 attaches to the disk drive into well-known screw receiving holes that are an industry standard on such disk drives. However the retainer can be installed by hand without the need for any additional hardware, such as a screw and no need for a tool such as a screwdriver. This feature is advantageous over prior art fasteners because it simplifies the manufacturing process and reduces cost by eliminating the need for tools and reducing the number of required actions to fasten the disk drive to the carrier support. It also allows for quick assembly thus saving time, and inherently reducing cost due to the time savings.

Figure 7:
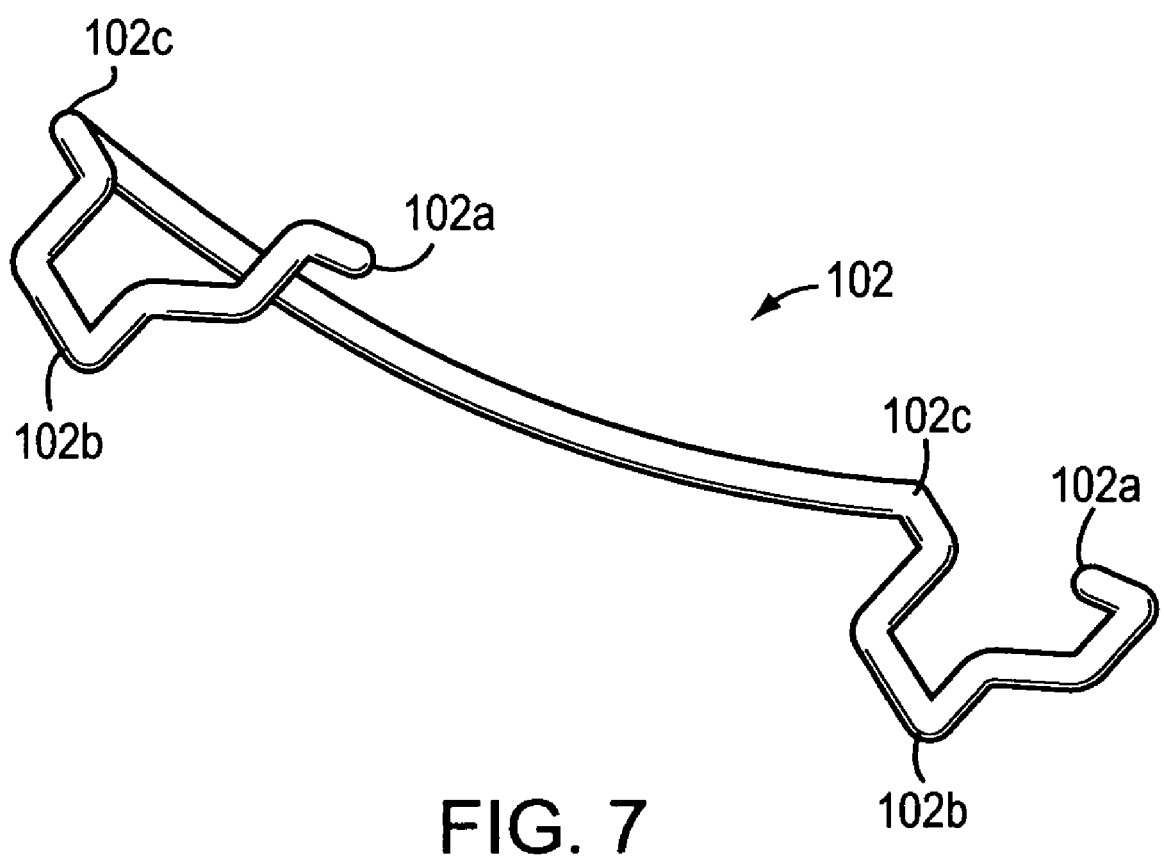
FIG. 7 shows a perspective view of the retainer.

FIG. 7 shows a perspective view of the retainer 102 that includes ends 102a that go through the screw holes in the disk drive. Portions 102b and 102c help secure the fastener to the carrier. Portion 102b is the portion that secures the retainer to tab 104 at the bottom of the carrier, and portion 102c is the portion that rests on the carrier on surface 129. The retainer includes appropriate turns and twists to allow the respective portions to be at the desired locations relative to the carrier. A good choice for the material composition of the retainer is stainless steel because it has good strength, durability, and elastic deformation properties so it can be held in the hand, placed into position, and well firmly hold the drive once attachment to the drive and carrier is made by the retainer at respective portions 102a and 102b. The retainer essentially has properties of a spring that allows it to deform and hold the disk drive in place.

The retainer essentially has properties of a spring that allows it to deform and hold the disk drive in place. The retention device includes a spring having an elongated body with two ends 102a and 102b equally spaced apart from each other along the body, wherein the two ends are sized for being received in industry standard screw-receiving holes in an industry standard format disk drive. The body has a shape that allows it to be placed to engage the support carrier in a manner that exerts a spring force on the support carrier and the industry standard format disk drive when the disk drive is engaged by the two ends being placed in its screw receiving ends and the spring is placed over at least a portion of the support carrier (FIGS. 1 and 2). The body preferably has a cylindrically shaped cross-sectional area (FIG. 7).

FIG. 4 shows a side view of the carrier with side 118 including opening 121 over which air flows in direction 150 over heat-sink pin fins to help remove heat conducted into the pin fins from the drive. One skilled in the art will recognize that air may also flow in another direction over the pins to achieve a similar result of heat removal. Heat can be transferred in three modes; conduction, convection, and radiation. Conduction is heat transfer through materials. Convection is heat transfer from a solid surface to a moving fluid. Radiation is heat transfer between objects with different temperatures through electromagnetic waves. The dominant heat transfer modes involved with this embodiment of the invention is conduction of the heat from the disk drive to the pin fins and forced air convection as air moves over the fins.

Fibre channel drives are used in data storage systems such as the Clariion data storage system from EMC Corporation. The 2.5" Fibre channel drives are expected to have about 80% of the power dissipation of a 3.5" drive yet they have only 40% of the surface area of the 3.5" drive. The volume of a 2.5" drive is only 24% of the 3.5" drive. The temperature at which the 2.5" drive is allowed to operate at will be unchanged from the 3.5" drive. What this means is that the heat flux, i.e. power per unit area or Watts/in$^2$ that is coming off the 2.5" drive will be almost two times that of the 3.5" drive yet the temperature must remain the same with the same inlet ambient air condition (e.g. 40C).

The surface area of the drive itself may not be enough to transfer heat to the surrounding fluid (air) and keep its temperature within specification. The inventors have critically recognized that extended surface areas are needed to be added in order to decrease the thermal resistance path. The heat created inside a disk drive are conducted through various materials to the fins of that act as heat-sink and then into moving air via convection.

The amount of power that can be removed by convection from a disk drive can be simplified with the algebraic equation $q=hA(T_{amb}-T_{dive})$. q is the power dissipated from the drive, h is the surface coefficient of heat transfer, A is the surface area, $T_{amb}$ is the surrounding ambient air temperature and $T_{amb}$ is the temperature of the disk drive. The term, h, lumps together many variables including air velocity, and fluid properties such as density and viscosity. Rearranged algebraically, $(T_{amb}-T_{amb})=q*1/hA$. This is analogous to ohm's law in electricity where V=IR. R is the resistance of a circuit with a voltage potential and resulting current I. The convection thermal resistance, 1/hA, shows that if you increase surface area, you will decrease the resistance to heat flow and thus lower the temperature of your solid body or disk drive in this case.

For the conduction portion of the problem, a simplified equation describing the heat transfer through a solid body is as follows; q=kA(T1−T2)/L. In electrical analogous (V=IR) form, (T1−T2)=q* L/(kA). The temperature difference across a body is directly proportional to the heat transfer rate (power dissipated) multiplied by the conduction resistance term L/kA. L is the length that the heat must pass through, k is the material property thermal conductivity and A is the cross-sectional area of the solid body. The inventors have recognized that with this equation, each solid body that the heat travels through in the path to the air can be analyzed and its resistance minimized. They have accomplished this by maximizing the cross-sectional area that the heat passes through, choosing materials with high conductivity and keeping path lengths short. In the case of the 3.5" to 2.5" carrier, these principles were used to minimize thermal resistances to lower the drive temperatures so that they do not exceed reliability temperature limits set but the drive manufactures. Integrating pin fins to the surface carrier is a novel arrangement that has been shown by the inventors to produce significant advantages.

The inventors have recognized that while the simple algebraic models discussed above are useful, that the details of heat transfer and fluid flow is more accurately governed by complex mixed partial differential equations that take very sophisticated software to approach a solution with a certain amount of acceptable error. Computational Fluid Dynamics (CFD) software was used by the inventors to analyze different scenarios and empirical measurements confirmed heat transfer advantages of the embodied invention discussed above with reference to FIGS. 1-4.

The inventors have further recognized that when inserting the carrier with smaller disk drive in a mixed configuration having larger disk drives that neighboring drives still must operate at or below their operating temperature limit. For example, when a 2.5" drive carrier is next to a 3.5" drive in a chassis, the airflow over the 3.5" must be maintained as previous to the insertion of the 2.5" drive in order to maintain proper drive temperatures.

Figure 5:
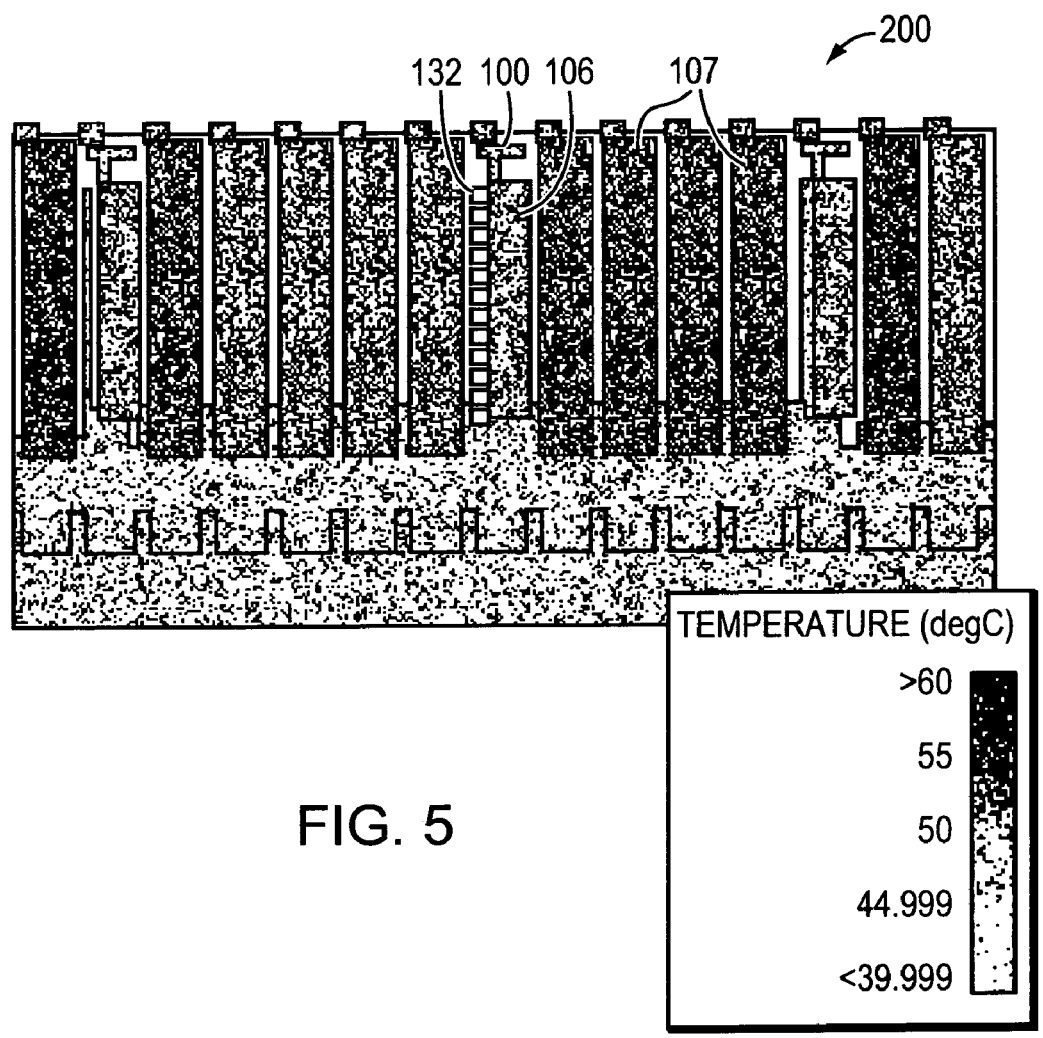
FIG. 5 shows an illustration of a measurement of temperatures of the support carrier with the disk drive attached in a chassis for a data storage system.
Figure 6:
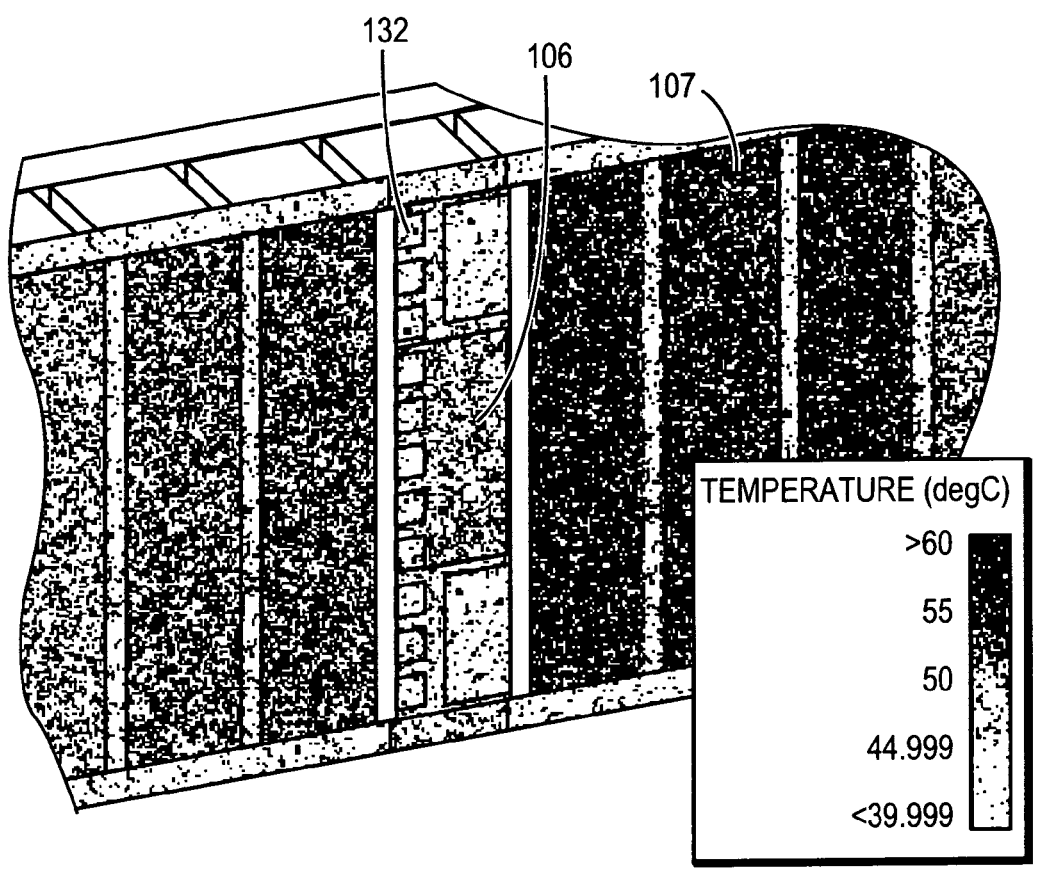
FIG. 6 shows a cross-sectional view of the support carrier with disk drive attached in a chassis for a data storage system.

FIGS. 5 and 6 show empirical evidence of the advantages of the preferred embodiment of this invention. FIG. 5 shows a chassis 200 with a plurality of 3.5" drives 107 and a smaller quantity of 2.5" drives including one drive 106 on support carrier 100 with protruding pin fins 132 over which forced air passes. It was noted that the fin pins and attached drive 106 are noticeably cooler than any other of the drives inserted in the chassis. In this Figure, the temperature scale shows that on the drawing more dense shading is used to represent higher temperatures. So for example, while some drives in the chassis were measured at greater than 60 Degrees C., that the drive 106 with pins 132 on its support carrier was significantly cooler with temperatures about 10 Degrees C. cooler on average. FIG. 6 shows a close up view of a cross-section view the chassis showing the temperature fields and shows the heat conducting from the drive 106 to the pin fin 132 heat-sink. The air between the fins is being heated and carrying heat away from the drive. Airflow is into the page in this view.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A support carrier for attaching a smaller format disk drive into a chassis bay sized for receiving a larger disk drive, the support carrier comprising:
   a frame surrounding an area in which a smaller format disk drive can be attached and supported, wherein the frame is sized for being received into bay of a chassis sized for a larger format disk drive;
   a planer surface inside the area in which the smaller format disk drive can be attached for supporting the smaller disk drive;
   a heat-sink surface disposed adjacently opposite of and attached to the planer surface for conducting heat from the smaller format disk drive;
   pin fins protruding from the surface for further conducting and removing heat from the smaller disk drive.

2. The support carrier of claim 1, wherein the pin fins are cylindrical in shape and the surface includes a thermal interface to provide a heat transfer path from the disk drive to the pin fins.

3. The support carrier of claim 2, wherein the pin fins are integrally attached to the heat-sink surface.

4. The support carrier of claim 3, wherein the pins are disposed in a matrix-array fashion along the heat-sink surface.

5. The support carrier of claim 4, wherein the smaller format disk drives are 2.5 inch format disk drives.

6. The support carrier of claim 5, wherein the larger format disk drives are 3.5 inch format disk drive.

7. The support carrier of claim 1, wherein the chassis includes an opening in the frame through which forced air is passed over the pin fins for removing heat from the disk drive.

8. The support carrier of claim 7, wherein the pin fins are cylindrical in shape.

9. The support carrier of claim 8, wherein the pin fins are integrally attached to the heat-sink surface.

10. The support carrier of claim 9, wherein the pins are disposed in a matrix-array fashion along the heat-sink surface.

11. The support carrier of claim 10, wherein the smaller format disk drives are 2.5 inch format disk drives.

12. The support carrier of claim 11, wherein the larger format disk drives are 3.5 inch format disk drive.

13. A support carrier for attaching a smaller format disk drive into a chassis bay sized for receiving a larger disk drive, the support carrier comprising:
   a frame surrounding an area in which a smaller format disk drive can he attached and supported, wherein the frame is sized for being received into bay of a chassis sized for a larger format disk drive;
   a planer surface inside the area in which the smaller format disk drive can be attached for supporting the smaller disk drive;
   a heat-sink surface disposed adjacently opposite of and attached to the planer surface for conducting heat from the smaller format disk drive;
   pin fins protruding from the surface for further conducting and removing heat from the smaller disk drive, wherein the chassis includes an opening in the frame through which forced air is passed over the pin fins for removing heat from the disk drive, wherein the pin fins are cylindrical in shape, wherein the pin fins are integrally attached to the heat-sink surface, wherein the pins are disposed in a matrix-array fashion along the heat-sink surface.

14. The support carrier of claim 13, wherein the smaller format disk drives are 2.5 inch format disk drives.

15. The support carrier of claim 14, wherein the larger format disk drives are 3.5 inch format disk drive.

16. An apparatus for attaching a smaller format disk drive into a chassis bay sized for receiving a larger disk drive, the support carrier comprising:
   frame means surrounding an area in which a smaller format disk drive can be attached and supported, wherein the frame means are sized for being received into a drive bay of a chassis sized for a larger format disk drive;
   planer surface means inside the area in which the smaller format disk drive can be attached for supporting the smaller disk drive;
   heat-sink surface means disposed adjacently opposite of and attached to the planer surface for conducting heat from the smaller format disk drive;
   pin fins means protruding from the surface for further conducting and removing heat from the smaller disk drive.

17. The apparatus of claim 16, wherein the pin fins are cylindrical in shape and the heat-sink surface includes a thermal interface to provide a heat transfer path from the disk drive to the pin fins.

18. The apparatus of claim 17, wherein the pin fins are integrally attached to the heat-sink surface.

19. A method of manufacturing a support carrier for attaching a smaller format disk drive into a chassis bay sized for receiving a larger disk drive, the method comprising the steps of:
   providing a frame surrounding an area in which a smaller format disk drive can be attached and supported, wherein the frame is sized for being received into bay of a chassis sized for a larger format disk drive;
   providing a planer surface inside the area in which the smaller format disk drive can be attached for supporting the smaller disk drive;
   providing a heat-sink surface disposed adjacently opposite of and attached to the planer surface for conducting heat from the smaller format disk drive; and
   providing pin fins protruding from the surface for further conducting and removing heat from the smaller disk drive.

* * * * *